United States Patent [19]
Brendle et al.

[11] Patent Number: 5,504,490
[45] Date of Patent: Apr. 2, 1996

[54] RADAR METHOD AND DEVICE FOR THE MEASUREMENT OF DISTANCE

[75] Inventors: Jean-Claude Brendle, Brest; Pascal Cornic, St Renan; Patrice Crenn, Brest, all of France

[73] Assignee: Thomson-CSF, Paris, France

[21] Appl. No.: 414,594

[22] Filed: Mar. 31, 1995

[30] Foreign Application Priority Data

Apr. 5, 1994 [FR] France .................................. 94 03963

[51] Int. Cl.$^6$ .................................................. G01S 13/08
[52] U.S. Cl. ...................... 342/118; 342/124; 340/618; 340/612
[58] Field of Search ..................... 342/118, 124; 340/618, 612

[56] References Cited

U.S. PATENT DOCUMENTS

| | | |
|---|---|---|
| 4,450,444 | 5/1984 | Wehner et al. . |
| 5,406,842 | 4/1995 | Locke ........................ 364/509 |
| 5,420,591 | 5/1995 | Annee et al. .................. 342/188 |

FOREIGN PATENT DOCUMENTS

| | | |
|---|---|---|
| 0574282A1 | 12/1993 | European Pat. Off. . |
| 0575221A1 | 12/1993 | European Pat. Off. . |

OTHER PUBLICATIONS

L'Onde Electrique, vol. 64, No. 4, Aug. 7, 1984; Paris, France, pp. 28–37; Georges Bienvenu and Laurent Kopp; "Methodes haute resolution pour la localisation de sources rayonnantes".

*Primary Examiner*—J. Woodrow Eldred
*Attorney, Agent, or Firm*—Oblon, Spivak, McClelland, Maier & Neustadt

[57] ABSTRACT

Disclosed is a method for the measurement, by means of a radar, of the distance from a useful obstacle that is surrounded by parasitic obstacles but sends back an echo which is more powerful than their echos. This method of measurement can be applied to the measuring of the level of liquid in a vessel. It consists in transmitting a sequence of nonmodulated microwave signals whose discrete angular frequencies are evenly distributed in a certain frequency band, demodulating the signals received in return for the transmitted signals, subjecting the received and demodulated signals to a reverse and discrete Fourier transform with a view to a coarse localization of the delay of the echo from the useful obstacle and a high resolution method for the localization of the radiating sources with a view to a more precise localization of the delay of the echo from the useful obstacle, said delay enabling the assessment of the distance from the useful obstacle to the radar. FIG. 5.

4 Claims, 4 Drawing Sheets

RADAR METHOD AND DEVICE FOR THE MEASUREMENT OF DISTANCE

BACKGROUND OF THE INVENTION

1. Field of the Invention

The present invention relates to the precise measurement of short distances by means of a radar and, notably., the measurement of a level of liquid in a vessel in the presence of parasitic reflexions.

2. Description of the Prior Art

A known method for measuring a level of liquid in a vessel by means of a radar consist in placing the radar above the vessel, vertically to the surface of the liquid, and in making it send out a sequence of non-modulated microwave sinusoidal signals $s_k$ whose discrete pulsations are evenly distributed in a frequency band B where the coefficient of reflexion of the surface of the liquid does not vary notably.

$$s_k = u \exp[j(w_0 + k\Delta w)t]$$

u being an amplitude coefficient, $w_0$ being the initial angular frequency, $\Delta w$ being the change in angular frequency at the passage from one signal to another, t being the time variable and k being a positive integer that varies between 0 and N–1, N being the number of elements of a sequence of signals.

The signals received by the radar coming from the reflexion of the signals sent out by the surface of the liquid and by different parasitic obstacles are demodulated by the signals set out and give rise, in baseband, to signals $r_k$ having the form:

$$r_k = \sum_{i=0}^{M-1} v_i \exp[-j(w_0 + k\Delta w)\tau_i] \quad k \in [0, N-1]$$

M being an integer representing the number of obstacles that send back echoes, whether it is by the major lobe or by the minor lobes of the radar, i being a positive integer that varies from 0 to M–1, $v_i$ being an amplitude coefficient depending on the coefficient of reflexion of the $i^{th}$ obstacle, and $\tau_i$ being the time taken by the transmitted signal to go from the radar to the $i^{th}$ obstacle and return therefrom, the obstacle having the index 0 being the surface of the liquid.

The set of signals $\{r_k\}$ carries out a sampling, in the field of the frequencies, of a function resulting from a summation of sinusoidal waves whose periodicity values depend on the $\tau_i$ values and hence on the distance $d_i$ from the different obstacles since:

$$\tau_i = 2d_i/c$$

c being the velocity of propagation of the waves ($3 \cdot 10^8$ m/s).

To extract the values of the times $\tau_i$ and hence obtain knowledge of the distances from the different obstacles, the usual practice is to equip the reception part of the radar with a processing circuit that carries out a discrete and reverse Fourier transform on all the received and demodulated signals $\{r_k\}$ which brings about a passage from the frequency domain to the time domain.

The values of $\tau_i$ correspond to maximum values of the function of the time obtained, the greatest maximum value corresponding to $\tau_0$ for the level of liquid is supposed to give the most powerful echo.

According to Woodward's formula, the precision G of the measurement of the period $\tau_0$ giving the level in the vessel is a function of the scanned frequency band B and of the energy signal-to-noise ratio R:

$$\sigma = \frac{1}{2\pi B \sqrt{R}}$$

In this use, this is not strictly speaking a limitation for the energy signal-to-noise ratio R varies little with the distance since the illuminated surface of liquid increases with the distance owing to the aperture of the illumination cone of the radar beam and may be great owing to the shortness of the distances to be measured. Thus, in theory, it will easily be possible to arrive at a precision of about 1 centimeter with a scanned frequency band of the order of 1 GHz.

In fact, there is another limitation due to the weakness of resolution of a discrete Fourier transform. Indeed, an elementary filter at output of a discrete and reverse FFT has a response in the temporal domain that is not infinitely narrow but has a major lobe with a width at 3 dB equal to the reverse 1/B of the scanned frequency band surrounded by minor lobes so much so that it is not possible to separate two echoes, one of which is a useful echo and the other is a parasitic echo, when they return to the radar at instants separated by a period of less than 1/B. In the case of a scanned frequency band of 1 GHz, the period is $10^{-9}$ seconds which corresponds, for the transmitted wave, to a to-and-from propagation distance of 15 cm. The result thereof is a lack of precision in distance measurement that is far greater than what might be expected from the Woodward's formula in this specific case.

One approach that might be considered to overcome this drawback would be to replace the discrete and reverse Fourier transform by a high resolution method for the localization of radiating sources. This approach has the advantage of having an infinite power of asymptotique resolution that is solely a function of the observation time. This type of method is well known in the prior art and is described, for example, by Georges Bienvenu and Laurent Kopp in *Méthodes haute résolution pour la localisation de sources rayonnantes* (High resolution methods for the localization of radiating sources) in *L'onde électrique*, July–August 1984, Vol. 6, No. 4, pp 28 to 37.

As shall be seen hereinafter, the implementation of a high resolution method for the localization of radiating sources requires, as a preliminary, the formulation of a hypothesis on the maximum number of useful and parasitic echoes liable to be encountered. This maximum number of echoes is then taken into account in the method which localizes them all, whether they are real or fictitious, in model-making attempt wherein the fictitious echoes may give rise to a response greater than that of the real echoes. There then arises a problem of identification of the useful echo from among the real and fictitious echoes localized by a high resolution method.

SUMMARY OF THE INVENTION

The present invention is aimed at making it easier to carry out this identification.

Its object is a method for the measurement of distance by means of a radar wherein:

- the radar is positioned so that the useful obstacle for which the distance is to be measured sends back the most powerful echo,

- the radar is made to transmit a sequence of non-modulated microwave signals $\{s_k\}$ whose discrete angular frequencies are evenly distributed in a scanned frequency band B $$s_k = u \exp[j(w_0 + k\Delta w)t]$$

u being a coefficient of amplitude, $w_0$ being an initial angular frequency, $\Delta w$ being the change in angular frequency at the passage from one signal to another, t being the time variable and k being a positive integer varying from 0 to N−1, N being the number of elements of the sequence of signals,

- in the radar, the signals received in return for the transmitted signals are made to be demodulated for the generation, in baseband, of a sequence of Signals $\{r_k\}$ having the form:

$$r_k = \sum_{i=0}^{M-1} v_i \exp[-j(w + k\Delta w)\tau_i]$$

M being an integer representing the number of obstacles sending back echoes, i being a positive integer varying from 0 to M−1, $v_i$ being a coefficient of amplitude depending on the coefficient of reflexion of the $i^{th}$ obstacle and $\tau_i$ being the time taken by the transmitted signal to go from the radar to the $i^{th}$ obstacle and return therefrom, the obstacle with the index 0 being the useful obstacle,

- and the sequence of signals received $\{r_k\}$ is processed in order to extract therefrom the value of the time $\tau_0$ corresponding to the useful obstacle for which it is sought to know the distance $d_0$ by means of the relationship:

$$\tau_0 = 2d_0/c$$

c being the velocity of propagation of the waves of the radar.

This method is noteworthy in that the processing of the sequence of the received signals $\{r_k\}$ consists of:

- a discrete and reverse Fourier transform enabling a coarse or approximate temporal localization of the useful echo by the selection of the output filter giving the strongest response,
- an implementation of a high resolution method for the localization of radiating sources giving a temporal localization of real or fictitious echoes,
- a selection, in the temporal localization of echoes given by the high resolution method, of a limited range centered on the selected output filter of the discrete and reverse Fourier transform, and
- the making of a choice, from said limited range, of the echo giving the strongest response as being the echo of the useful obstacle for which it is sought to measure the distance, and the making of an estimation of the distance $d_A$ of the useful obstacle by means of the relationship:

$$d_0 = \tau_0 \cdot c/2$$

In this method, the discrete and reverse Fourier transform is used for a coarse localization of the useful echo while the high resolution method is used only to refine the position of the useful target in a limited range for which it is known that there is a real echo which is the useful echo and where, consequently, the modelling given by the high resolution method is faithful.

Advantageously, the high resolution method used is the MUSIC (MUltiple SIgnal Classification) method.

An object of the invention is also a radar device implementing the above-mentioned method.

BRIEF DESCRIPTION OF THE DRAWINGS

Other advantages and features of the invention shall emerge from the following description of an embodiment given by way of an example. This description is made with reference to the appended drawings, of which.

MORE DETAILED DESCRIPTION

Figure 1:
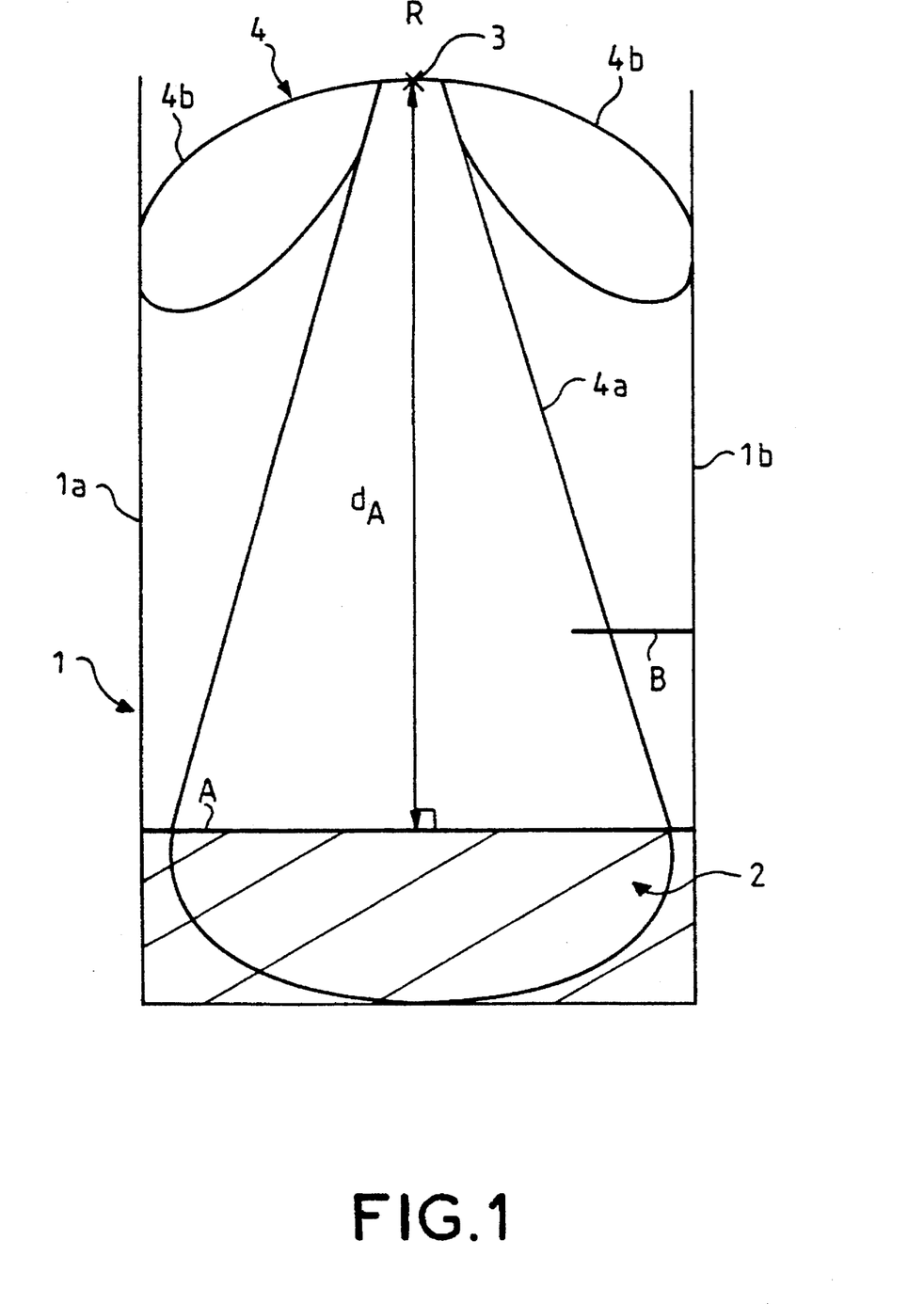
FIG. 1 gives a schematic illustration of the environment of a radar used for a measurement of the level of a liquid in a vessel.

FIG. 1 shows the disposition of a radar for the measurement of the level of a liquid in a vessel, for example a petrol tank or a hydrocarbon storage installation.

The vessel 1 is filled with a liquid 2. Its internal walls 1a, 1b are metallic with projecting structural elements. The radar 3 is placed above the vessel 1 at a point R. Its transmission and reception pattern show a major lobe 4a whose aiming direction is normal to the surface of the liquid 2 and minor lobes 4b oriented towards the walls of the vessel 1.

The surface A of the liquid 2 sends back, to the radar 3, the useful echo used to measure the distance dA from the radar to the surface of the liquid and, consequently, the level of liquid in the vessel. With the useful echo, the radar receives a multitude of parasitic echoes having lower power values generated by the upper parts of the internal walls of the vessel which are illuminated by the minor lobes and by the projecting structural elements, such as B, above the level of liquid. To measure the level of the liquid, it is therefore necessary, firstly, to discriminate between the useful echo from the surface of the liquid and parasitic echoes that are all the more troublesome as they are close to the surface of the liquid and, secondly, assess the delay of the useful echo which is proportional to the distance between the radar and the surface of the liquid.

Figure 2:
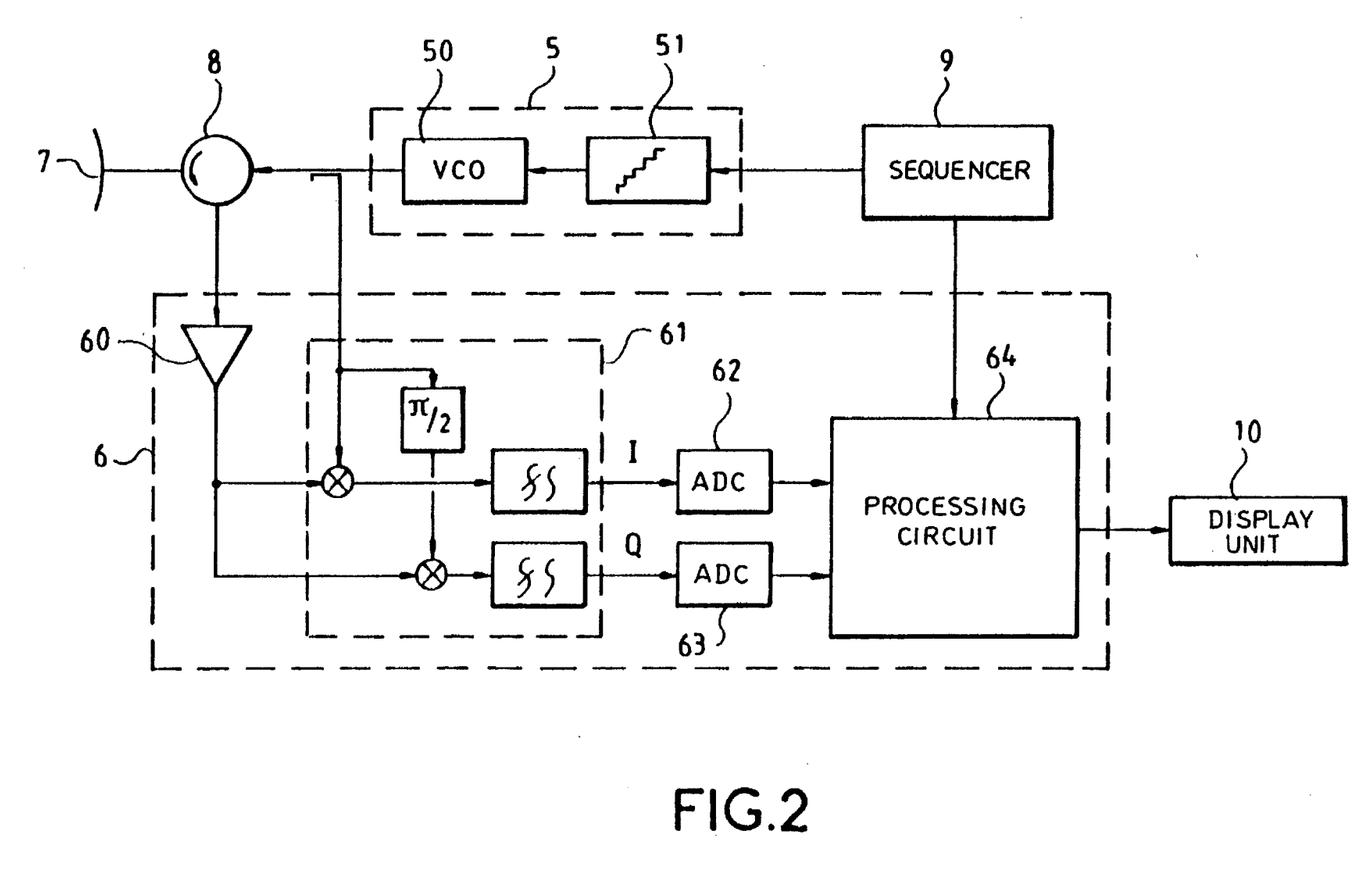
FIG. 2 is a functional diagram of a radar implementing the method according to the invention.

The radar 3 has, as shown in FIG. 2, a transmission part 5 and a reception part 6 which are coupled to an antenna 7 by means of a duplexer 8 and have their pace set by a sequencer 9. The radar 3 also has a display unit 10.

The transmission part 5 has a voltage-controlled oscillator 50 and a stepped voltage ramp generator 51. The voltage-controlled oscillator 50 gives the microwave transmission signal of the radar applied to the antenna 7 by means of the duplexer 8. The voltage ramp generator 51 has its pace set by the sequencer 9 and controls the voltage-controlled oscillator 50 to make it generate a sequence of non-modulated microwave signals $\{s_k\}$ whose discrete angular frequencies are evenly distributed in a frequency band B where the coefficient of reflexion of the surface of the liquid does not vary significantly:

$$s_k(t) = u \exp[j(w_0 + k\Delta w)t]$$

u being an amplitude coefficient, $w_0$ being the initial angular frequency, $\Delta w$ being the change in angular frequency at the passage from one signal to the next, and k being a positive integer that varies between 0 and N−1, N being the number of signals of different frequencies generated by the voltage-controlled oscillator 50 or again the number of steps of a ramp of the voltage generator 51. In practice, $w_0$ is an X band angular frequency of the order of 10 GHz, $\Delta w$ is equal to 1 MHz and N is equal to about a thousand. Each microwave signal $s_k$ transmitted by the radar is reflected by the surface of the liquid and by different parasitic obstacles and returns to the radar in the form of a signal:

$$R_k(t) = \sum_{i=0}^{M-2} v_i \exp[j(w_0 + k\Delta w)(t - \tau_i)]$$

M being an integer representing the number of useful and parasitic obstacles sending back echoes by the major lobe or by the minor lobes of the radar, i being an integer varying from 0 to M−1, $v_i$ being a coefficient of amplitude depending on the coefficient of reflexion of the $i^{th}$ obstacle and $\tau$ being the time taken by the transmitted signal to go from the radar to the $i^{th}$ obstacle and return therefrom.

To process this signal, the radar comprises, in its reception part 6, a low-noise input stage 60 followed by a synchronous demodulator 61 in quadrature, two analog-digital converters 62, 63 positioned on the in-phase (I) and quadrature (Q) outputs of the demodulator 61, and a processing circuit 64. This processing circuit 64 analyzes the digital samples given by the analog-digital converters 62, 63 to deduce therefrom the level of the liquid in the vessel, this information being intended for the display unit 10.

The low-noise input stage 60 receives the signals $R_k$ from the antenna 7 through the duplexer 8. It filters these signals $R_k$ so as to limit the noise band and amplifies them to bring them to an adequate level for their demodulation.

The demodulator 61 which receives the transmission signal $s_k$, as a local carrier, from the voltage-controlled oscillator 50, brings the signals $R_k$ into the baseband and delivers the components I and Q of signals $r_k$ at its in-phase and quadrature outputs. These components I and Q of signals $r_k$ have the form:

$$r_k = \sum_{i=0}^{M-1} v_i \exp[-j(w_0 + k\Delta w)\tau_i] + \eta_k$$

$\eta_k$ being a Gaussian noise introduced by the reception part of the radar.

The processing circuit 64 receives digital samples from the in-phase and quadrature components of the signals $r_k$ delivered by the analog-digital converters 62, 63 and synchronization signals from 0 the sequencer 9. It starts by taking the average of the digital samples of each signal $r_k$ for the duration of the transmission signal $s_k$ so as to improve the signal-to-noise ratio.

Once this average has been taken, it carries out a discrete and reverse Fourier transform on all the $\{\bar{r}_k\}$ signals so as to go from the frequency domain to the temporal domain. This discrete and reverse Fourier transform can be done for example on 1024 points if the number N of the signals of different frequencies transmitted is 1024. It provides approximate knowledge of the power of the echoes as a function of their delay $\tau$ and consequently enables the approximate location of the delay $\tau_0$ of the echo at the surface of the liquid which corresponds to the maximum of the curve obtained when the radar is installed above the vessel so that the strongest echo comes from the surface of the liquid.

Figure 3:
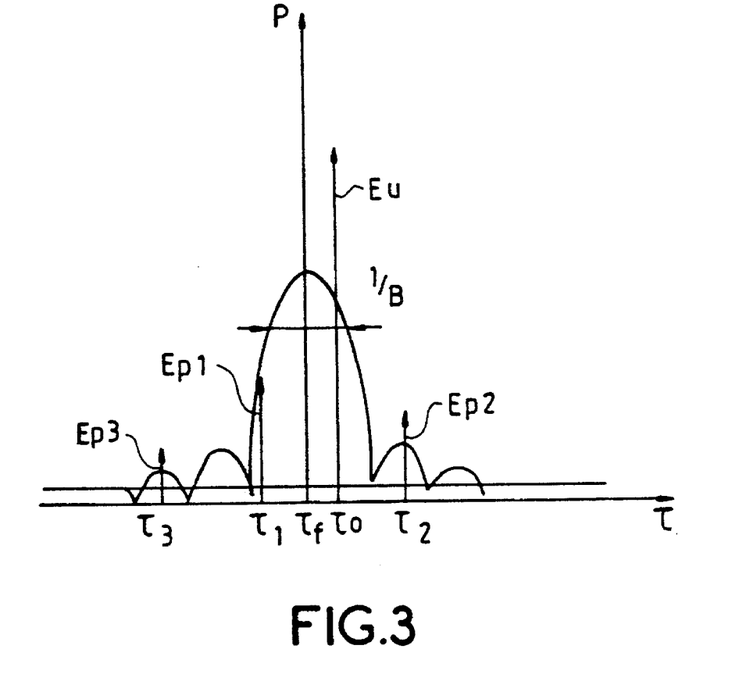
FIG. 3 is a graph illustrating the width of the range of response of a reverse Fourier transform filter.

As can be seen from FIG. 3, the determining of the period $\tau_0$ by the discrete and reverse Fourier transform is a fairly approximate operation since the parasitic echoes close to the useful echo modify the position of the maximum obtained. Indeed, the elementary discrete and reverse Fourier transform filters have a response in the temporal domain that is not infinitely narrow but has a major lobe with a width at 3 dB equal to the reverse 1/B of the scanned band and minor lobes that decrease continuously and ultimately merge into the noise level.

This FIG. 3 illustrates the case where the useful echo $E_u$ occurs with a delay $\tau_0$ in the major lobe of the response of a filter centered on the delay $\tau_f$ having a slightly smaller duration while a parasitic echo $E_{p1}$ occurs with a smaller delay $\tau_1$ that also falls within the major lobe of the filter centered on the delay $\tau_f$ and while other parasitic echoes $E_{p2}$, $E_{p3}$ that are less close fall within the minor lobes of the filter centered on the delay $\tau_f$. This filter gives a maximum response for the delay $\tau_f$ while the delay sought is $\tau_0$. When there are parasitic echoes, the discrete and reverse Fourier transform therefore does not enable an appreciation, in every case, of the delay $\tau_0$ of the useful echo with a precision greater than the reverse 1/B of the scanned frequency band. As we have seen further above, a scanned frequency band of 1 GHz gives a degree of uncertainty on the measurement of the delay of the useful echo in the range of $10^{-9}$ s which corresponds to a degree of uncertainty on the measurement of distance equal to 15 cm which may be considerable for a measurement of level.

To reduce this uncertainty by at least one order of magnitude, the processing circuit is made to carry out a localization of the useful and parasitic echoes by a MUSIC type high resolution method. The result of this localization is kept only in a zone centered on the Fourier transform filter that has given the maximum response to assume that the delay $\tau_0$ of the useful echo is the strongest echo localized in this zone. For this purpose, on the basis of the demodulated received signals $\{\bar{r}_k\}$ for which the average has been computed, an observation vector is built:

$$X_p(k) = \begin{pmatrix} \bar{r}_k \\ \bar{r}_{k+1} \\ - \\ - \\ \bar{r}_{k+p-2} \\ \bar{r}_{k+p-1} \end{pmatrix}$$

A study is made of the progress of this observation vector as a function of the frequency (coefficient k). The dimension of this observation vector is chosen so as to be greater than the maximum number of useful and parasitic echoes liable to be encountered by four to five units. In the present case of the measurement of levels in a vessel, this number is also four to five so that the dimension p of the observation vector is of the order of ten.

The estimate $\hat{\Gamma}_p$ of the self-correlation matrix of the observation vector is then set up such that:

$$\hat{\Gamma}_p E[X_p X_p^{t*}]$$

with $X_p^{t*}$ as the transconjugate of $X_p$. This estimate $\hat{\Gamma}_p$ of the self-correlation matrix is a p-sized square matrix with a term of ranks i, j defined by:

$$\hat{\Gamma}_p(i,j) = \frac{1}{N-p} \sum_{k=0}^{N-1-p} \bar{r}_{i+k} \times \bar{r}_{j+k}^*$$

\* indicating the conjugate term. The extent of the summation, namely the value of N−1−p conditions the value of the estimations.

The self-correlation matrix $\Gamma_p$ has specific properties with regard to the vector $a(\tau)$ modelling the frequency response of an echo with a delay $\tau$:

$$a_p(\tau) = \begin{vmatrix} \exp\left(-\frac{1}{j}\right)\Delta\omega\tau \\ - \\ - \\ \exp(-j(p-2)\Delta\omega\tau) \\ \exp(-j(p-1)\Delta\omega\tau) \end{vmatrix}$$

which enables the problem of localization of the echoes to be resolved.

It is a positive defined Hermitian matrix which means that it can be diagonalized with positive real eigenvalues and orthogonal eigenvectors.

The space E generated by its eigenvectors may be split up into two orthogonal sub-spaces: a source sub-space $E_s$ defined by an orthogonal base of eigenvectors $l_0, \ldots, l_{l-1}$ corresponding to the eigenvalues having the greatest values and a noise sub-space $E_b$ defined by an orthogonal base of the remaining eigenvectors $l_l, \ldots, l_{p-1}$ corresponding to the lowest remaining eigenvalues, which are all equal to the mean noise power $\sigma^2$.

The source sub-space $E_p$ has, as its dimension 1, the number of echoes actually encountered while the noise sub-space $E_b$ has the dimension p-1.

The localizing of the echoes is done by making use of the fact that the frequency contribution of an echo has the form of the modellized vector $a_p(\tau)$ for a particular value of $\tau$ for which the modelled vector belongs to the source sub-space $E_s$ and is consequently orthogonal to the noise sub-space $E_b$ so that, for this particular value, there should be:

$$\sum_{j=1}^{p-1} |a^t(\tau) \cdot l_j|^2 = 0$$

The different particular values of corresponding to localized echoes can then be likened to the values of $\tau$ giving rise to maximum values of the reverse of the projection of the model vector in the noise sub-space $$\max \, G^{-1}(\tau) = \left( \sum_{j=l}^{p=1} |a^t(\tau) \cdot l_j|^2 \right)^{-1}$$

t indicating a transposition.

The progress of this process of localization in which the self-correlation matrix $\Gamma_p$ is replaced by its estimated value $\hat{\Gamma}_p$, which is the only value accessible by measurement, is known as the MUSIC high resolution method.

In practice, the approximation of the self-correlation matrix $\Gamma_p$ by its estimated value $\hat{\Gamma}_p$ means that the transition between the eigenvalues of the source sub-space $E_s$ and the eigenvalues of the noise sub-space $E_b$ is gradual instead of being sudden. As a result, it is difficult to locate the boundary between the two sub-spaces if there is no a priori knowledge of the number of real echoes encountered: this is the case in a measurement of level in a vessel.

To determine the noise sub-space, what is done then is to restrict the operation to the eigenvectors corresponding to the low eigenvalues in the range of the mean noise power. The noise sub-space is then underestimated and the source sub-space is overestimated. The result thereof is that local maximum values are found for the reverse of the projection of the model vector in the reduced noise sub-space considered, these local maximum values corresponding to the real echoes but also to the fictitious echo. Since the maximum values found for the fictitious echoes may be greater than the maximum values found for real echoes, the identifying of the greatest of the maximum values does not necessarily lead to the localizing of the useful echo. The MUSIC method can be used to remove the ambiguity introduced by fictitious echoes when the operation is focused on a restricted range of variation of the delay $\tau$ centered on the one predetermined by the reverse Fourier transform.

Figure 4:
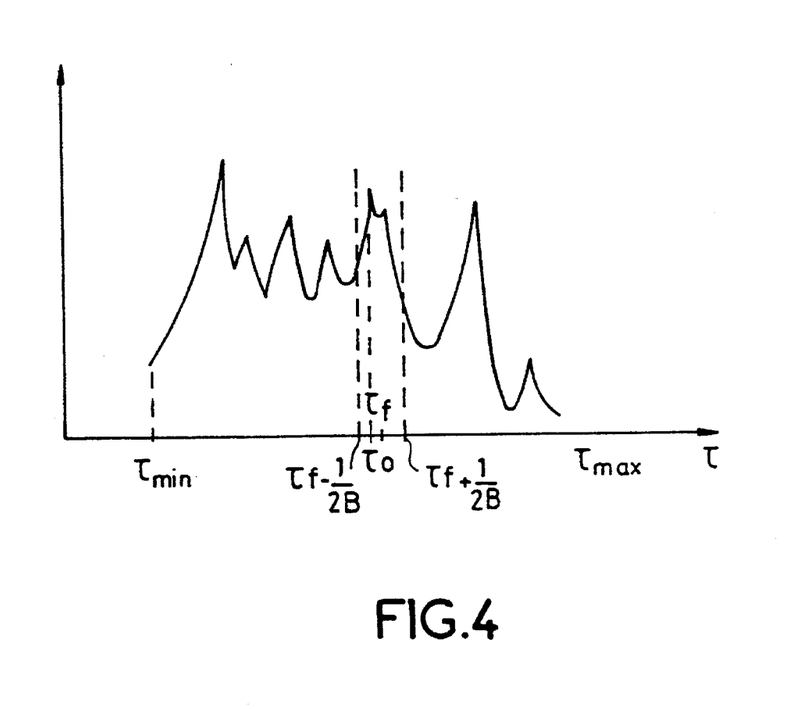
FIG. 4 is a graph illustrating the behavior as a function of the delay $\tau$ of the quantity to be maximized in a high resolution method for the localization of MUSIC type echoes.

FIG. 4 shows the appearance of the variation of the reverse of the projection of the model vector on the noise sub-space $E_b$ as a function of the delay $\tau$ with its maximum values corresponding to real and fictitious echoes. The limitation to the determined range $[\tau_f-\frac{1}{2} B, \tau_f+\frac{1}{2} B]$ by the Fourier transform removes all uncertainty about the maximum value corresponding to the useful echo of the surface of the liquid.

Figure 5:
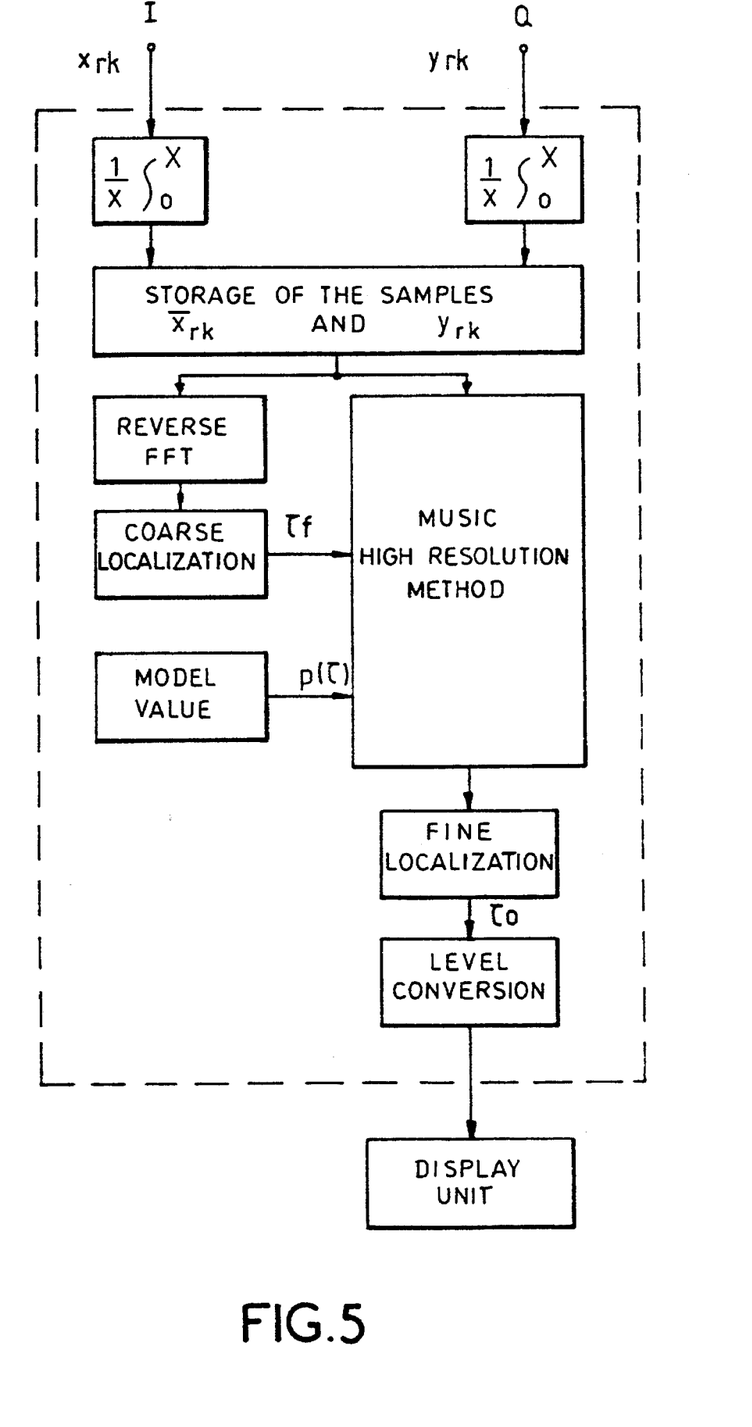
FIG. 5 illustrates the architecture of the processing circuit of the reception part of the radar of FIG. 2.

FIG. 5 illustrates the architecture of the processing operation performed in the processing circuit 64 of FIG. 2 which is a computer-based circuit. The average is taken of the samples $x_{rk}$ and $Y_{rk}$ of the in-phase and quadrature components of the signals $r_k$ given by the analog-digital converters 62, 63 for the duration of each transmission signal $s_k$. These samples are then memorized for the duration of transmission of the sequence of the signals $s_k$. Once memorized, they are used to carry out a discrete and reverse Fourier transform and implement a MUSIC type high resolution method.

The discrete and reverse Fourier transform carries out a coarse localization of the useful echo by locating the delay $\tau_f$ on which its filter delivering the output signal with maximum power is centered.

The implementation of the MUSIC type high resolution method enables the localizing of the useful echo to be made more precise. It consists in building a observation vector $X_p(k)$ with a size p equal to about twice the maximum number of echoes expected, preparing the estimated value $\hat{\Gamma}_p$ of the self-correlation matrix of this observation vector, computing the eigenvalues and eigenvectors of this estimated value, choosing the eigenvectors corresponding to low eigenvalues neighboring the average noise power to define a noise sub-space $E_b$, projecting a model vector $a_p(\tau)$ on the noise sub-space $E_b$, making a search in a narrow range of variation about the delay $\tau_f$ given by the Fourier transform, the delay $\tau_m$ corresponding to the maximum of the reverse of the projection of the model vector $a_p(\tau)$ on the noise sub-space $E_b$ and adopting this value $\tau_m$ as the value $\tau_0$ of the delay of the useful echo.

Once the value $\tau_0$ of the delay of the useful echo is determined, the processing circuit makes a deduction therefrom of the measurement of the distance $d_A$ from the radar to the surface of the liquid by the relationship:

$$d_A = \frac{c\tau_0}{2}$$

It then converts this value of distance into a value of level that it communicates to the display unit.

Instead of the MUSIC method, it is possible to contemplate other high resolution methods such as the auto-regressive methods described in the article by S. M. Kay and S. L. Marple in *Proceedings of the IEEE*, Vol. 69, No. 11, November 1981, pp 1380 and ff.

In the same way as here above, these methods seek to make a search, in a reduced range, for a model suited to observations. The advantage of these methods is their ease of implementation in the form of auto-regressive adaptive filters.

The method of measuring distance by means of a radar, which has just been described in the context of the measurement of level in a vessel, can be applied whenever it is necessary to make a radar measurement of the distance of an object in a complex environment sending back, with the echo of the object, parasitic echoes of lower power that jam the measurement. Another exemplary application is that of traffic control for vehicles by means of radars placed on portal structures overhanging traffic routes or in tunnels as radar echoes from vehicles are scrambled by the parasitic radar echoes from the ground or from the walls of the tunnels.

What is claimed is:

1. A method for the measurement of distance by means of a radar wherein:

the radar is positioned so that the useful obstacle for which the distance is to be measured sends back the most powerful echo, the radar is made to transmit a sequence of non-modulated microwave signals $\{s_k\}$ whose discrete angular frequencies are evenly distributed in a scanned frequency band B $$s_k = u \exp[j(w_0 + k\Delta w)t]$$

u being a coefficient of amplitude, $w_0$ being an initial angular frequency, $\Delta w$ being the change in angular frequency at the passage from one signal to another, t being the time variable and k being a positive integer varying from 0 to N−1, N being the number of elements of a sequence of signals, the radar is made to demodulate the signals received in return for the transmitted signals for the generation, in video band, of a sequence of signals $\{r_k\}$ having the form:

$$r_k = \sum_{i=0}^{M-1} v_i \exp[-j(w_0 + k\Delta w)\tau_i]$$

M being an integer representing the number of useful and parasitic obstacles sending back echoes, $v_i$ being a coefficient of amplitude depending on the coefficient of reflexion of the $i^{th}$ obstacle and $\tau_i$ being the delay or time taken by the signal transmitted by the radar to go to the $i^{th}$ obstacle and return therefrom, the obstacle with the index 0 being the useful obstacle, and and the sequence of received and demodulated signals $\{r_k\}$ is processed in order to extract therefrom the value of the delay $\tau_0$ and to deduce therefrom the distance $d_A$ from the radar to the useful obstacle by means of the relationship:

$$d_A = \frac{\tau_0 \cdot c}{2}$$

c being the velocity of propagation of the waves of the radar, wherein the processing of the sequence of the received signals $\{r_k\}$ consists of:

a discrete and reverse Fourier transform enabling a coarse temporal localization of the useful echo by the selection of the output filter giving the strongest response, an implementation of a high resolution method for the localization of radiating sources giving a temporal localization of real or fictitious echoes, a selection, in the temporal localization of echoes given by the high resolution method, of a limited temporal range centered on the selected output filter of the discrete and reverse Fourier transform, and the making of a choice, from said limited range, of the echo giving the strongest response as being the echo of the useful obstacle and the adoption of its delay as the value of the delay $\tau_0$, an estimation of the distance $d_A$ of the useful obstacle by means of the relationship:

$$d_A = \frac{\tau_0 \cdot c}{2}.$$

2. A method according to claim 1, wherein said limited temporal range centered on the selected output filter of the discrete and reverse transform has a width equal to the reverse 1/B of the frequency band scanned by the sequence of the microwave transmission signals.

3. A method according to claim 1, wherein the high resolution method for the localization of radiating sources is the MUSIC method.

4. A radar device for the measurement of the distance of a useful obstacle that is surrounded by parasitic obstacles and sends back an echo more powerful than those of the parasitic obstacles, comprising:

transmission means generating a sequence of non-modulated microwave signals $\{s_k\}$ whose discrete angular frequencies are evenly distributed in a scanned frequency band B $$s_k = u \exp[j(w_0 + k\Delta w)t]$$

u being a coefficient of amplitude, $w_0$ being an initial angular frequency, $\Delta w$ being the change in angular frequency at the passage from one signal to another, t being the time variable and k being a positive integer varying from 0 to N−1, N being the number of elements of the sequence of signals, reception and demodulation means receiving the signals sent back as echos by useful and parasitic signals and demodulating them by the transmitted signals for the generation, in baseband, of a sequence of signals $\{r_k\}$ having the form:

$$r_k = \sum_{i=0}^{M-1} v_i \exp[-j(w_0 + k\Delta w)\tau_i]$$

M being an integer representing the number of useful and parasitic obstacles sending back echoes, $v_i$ being a coefficient of amplitude depending on the coefficient of reflexion of the $i^{th}$ obstacle and $\tau_i$ being the time taken by the transmitted signal to go from the radar to the $i^{th}$ obstacle and return therefrom, the obstacle with the index 0 being the useful obstacle, processing means extracting, from the sequence of received and demodulated signals $\{r_k\}$, the value $\tau_0$ of the delay of the echo from the useful obstacle and deducing therefrom the distance dA from the radar to the useful obstacle by means of the relationship:

$$d_A = \tau_0 \cdot c/2$$

c being the velocity of propagation of the waves of the radar, wherein said processing means comprise:

means to carry out a discrete and reverse Fourier transform on the sequence of received and demodulated signals $\{r_k\}$, means to select the output filter of the means for implementing the Fourier transform giving the strongest response, means to implement a high resolution method for the localization of radiating sources working on the sequence of received and demodulated signals $\{r_k\}$ and giving a temporal localization of real or fictitious echoes, means to limit the temporal localization of real and fictitious echoes to a limited range centered on the selected output filter of the means to implement the Fourier transform, and means to discriminate the echo giving the strongest response in the limited range of the temporal localization of echos adopting the delay of this echo as being the delay $\tau_0$ of the useful obstacle, and means to estimate the distance $d_A$ of the useful obstacle by implementing the relationship:

$$d_A = \tau_0 \cdot c/2$$

* * * * *